United States Patent [19]
Yang

[11] Patent Number: 5,893,564
[45] Date of Patent: Apr. 13, 1999

[54] MECHANICAL FACE SEAL ASSEMBLY

[75] Inventor: Jibin Yang, Troy, Mich.

[73] Assignee: Meritor Heavy Vehicle Systems, LLC, Troy, Mich.

[21] Appl. No.: 08/862,797

[22] Filed: May 23, 1997

[51] Int. Cl.[6] .................................................. F16J 15/34
[52] U.S. Cl. ........................................................ 277/374
[58] Field of Search .............................. 277/348, 373, 277/374, 379, 390, 391, 394

[56] References Cited

U.S. PATENT DOCUMENTS

| | | |
|---|---|---|
| 3,511,513 | 5/1970 | Dahlheimer .................. 277/373 X |
| 4,451,049 | 5/1984 | Charhut ........................ 277/374 |
| 5,199,719 | 4/1993 | Heinrich et al. ............... 277/374 |

*Primary Examiner*—Anthony Knight
*Assistant Examiner*—Gary Grafel

[57] ABSTRACT

A mechanical face seal assembly has a cylindrical retainer fixedly mounted between a rotating shaft and a stationary housing. The rotating shaft defines a longitudinal axis and a rotating sealing ring rotates with the shaft. The rotating sealing ring is axially offset from the retainer. The retainer includes inner and outer legs which extend longitudinally along the axis and are radially spaced with respect to each other. The assembly also includes a non-rotating washer disposed within the retainer. A spring biases the washer towards the sealing ring. The invention also includes a method of easily assembling a seal by deforming an outer leg of the retainer after assembly of the seal components.

20 Claims, 2 Drawing Sheets

MECHANICAL FACE SEAL ASSEMBLY

BACKGROUND OF THE INVENTION

This invention relates to a mechanical face seal assembly for rotating shaft assemblies which is less expensive than known seals.

Mechanical face seals are commonly used to prevent gases and liquids from leaking along rotating shaft assemblies. The seal must be capable of sealing the shaft both statically and dynamically. That is, both when the shaft is rotating and when it is stopped. Further, the seal is required to withstand high operating pressures, temperatures and shaft speeds. Mechanical face seals provide longer life and less leakage than radial lip seals. Face seals are used in pumps due to their ability to withstand large changes in pressure. This type seal is also compatible with many fluids.

Typically a face seal is provided between a rotating shaft and a fixed housing. In known face seals a seal ring is fixed to a housing wall. A spring biased washer rotates with the shaft and is biased toward the seal ring. The washer and spring must be carefully balanced, since they rotate. The primary sealing effect takes place at opposed faces of the washer and seal ring. Secondary sealing elements are often necessary to augment the primary seal.

Known mechanical face seals often fail because the secondary seal between the shaft and the washer wears down due to vibration and shaft galling caused by abrasive particles in the fluid. Therefore, the seal has to be replaced. Replacement is costly and time consuming. It is common for the secondary seal to be replaced as often as once a month. More recently, in some applications mechanical face seals can last about 0.5 million miles (i.e., approximately the lifetime of a truck). However, these long lived seals are very expensive.

Therefore, a major concern is reducing the cost of a long-lived face seal. One main factor influencing the cost of the seal is due to the rotating washer and the need to balance the spring and the washer. The process of balancing the spring and the washer is difficult.

Further, the known rotating washer does not permit a compact mechanical face seal. The prior art fails to address the need to produce a mechanical face seal that is less costly.

Accordingly there remains a need for a mechanical face seal that can be fabricated easily and economically.

SUMMARY OF THE INVENTION

In a disclosed embodiment of this invention, a face seal assembly for a rotating shaft includes a seal ring which rotates with the shaft. A spring biased washer is received in a retainer which is fixed to a housing surrounding the shaft. Thus, the washer and the spring do not rotate, and precise balancing of these components is not necessary.

In other features of this invention, a non-rotation structure is provided between the washer and the retainer such that the washer may move axially toward and away from the seal, but will not rotate.

The retainer preferably includes a leg which extends axially beyond the seal ring, and then is deformed radially inwardly such that a face of the leg secures the seal ring and washer within the retainer. Preferably, a labyrinth seal is also provided between the seal ring and retainer.

In a method according to this invention, the retainer is initially formed without the radially inwardly extending leg. The components of the seal are assembled, and the outer leg is then deformed radially inwardly to form a unitized seal body. After assembling the seal, it is mounted into the housing or onto the shaft.

The present invention discloses a long-lived, easy to assemble seal which is inexpensive compared to the known art.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
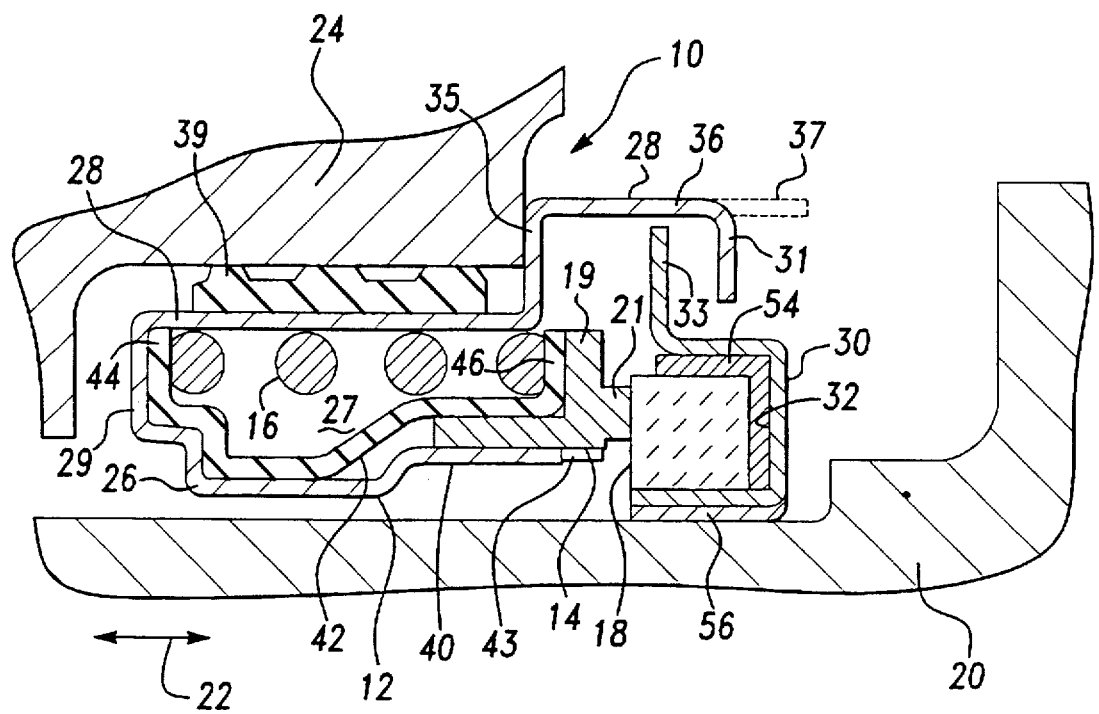
FIG. 1 is a cross sectional view of a mechanical face seal assembly according to the invention.

FIG. 1 shows a mechanical face seal assembly 10 including a retainer 12, a washer 14, a spring 16 and a sealing ring 18 for a rotating shaft 20. Retainer 12 is positioned within a stationary housing 24 and mounted radially outwardly of rotating shaft 20. Shaft 20 defines a longitudinal axis 22. Retainer 12 has inner leg 26 and outer leg 28 connected by a base 29 to define a recess 27. Legs 26 and 28 are generally cylindrical and surround shaft 20. A sealing ring 18 is positioned axially outside recess 27 and fixed to rotate with shaft 20. A non-rotating washer 14 surrounds shaft 20 and is axially movable within recess 27 and toward ring 18. A spring 16 is disposed in recess 27 and biases washer 14 toward ring 18. In mechanical face seals it may be desirable to maintain a thin lubricant film between washer 14 and ring 18, rather than have actual contact.

In known mechanical face seals, the washer rotates with the shaft and is biased toward the seal ring. With these known seals, the washer and spring must be carefully balanced because they rotate. The subject invention includes rotating ring 18 while washer 14 does not rotate. This difference allows the assembly 10 to be assembled without complicated balancing required by known seal assemblies because washer 14 and spring 16 are not rotating. The washer 14 has a rim 19 at an outer periphery and a sealing portion 21 extending from the rim axially toward the ring 18 at a location radially inward of rim 19. The spring 16 applies its bias force at the rim.

A shield 30 and retainer 12 form a labyrinth seal. Shield 30 is attached to the shaft and provides a seat 32 for ring 18. Shield 30 also extends radially outwardly beyond ring 18. A face 31 of the outer leg 28 opposes a face 33 of the shield 30 to form a labyrinth seal. The seal between portion 21 and seal ring 18 is particularly useful when shaft 20 is not rotating. The labyrinth seal prevents contaminants from reaching the contact seal area.

Outer leg 28 has a hollow annular collar 36 which in an undeformed orientation has portion 37 extending beyond shield 30. Portion 35 of outer leg 28 extends outwardly along a face of housing 24, and collar 36 extends from portion 35. As can be appreciated, portion 35 extends radially outwardly from the nominal position of outer leg 28. The radially outermost end of shield face 33 is radially outward of the nominal location of the outer leg 28. However, portion 35 extends radially beyond the radially outermost end of shield face 33. Collar 36 extends beyond the radially outermost portion of the shield face 33, and face 31 then extends back radially inwardly. This combination forms an effective labyrinth seal preventing leakage. A resilient ring 39 rests between retainer 12 and housing 24. Ring 39 maintains retainer 12 secure, and prevents retainer 12 from vibrating between housing 24 and shaft 20.

A bellows 42 is mounted within the retainer 12 for supporting the spring 16 and moving the washer 14 longitudinally along the axis 22. Bellows 42 also has a pair of axially spaced first and second ends 44, 46. End 46 is complementary with rim 19 surrounding the washer 14. End 44 fits flush with base 29 of retainer 12. The bellows 42 provides an expandable seal.

Rubber strip 54 is disposed between ring 18 and the shield 28. Ring 18 and strip 54 are press fit into seat 32. Rubber strip 56 is disposed between the shield 30 and the shaft 20.

Figure 2:
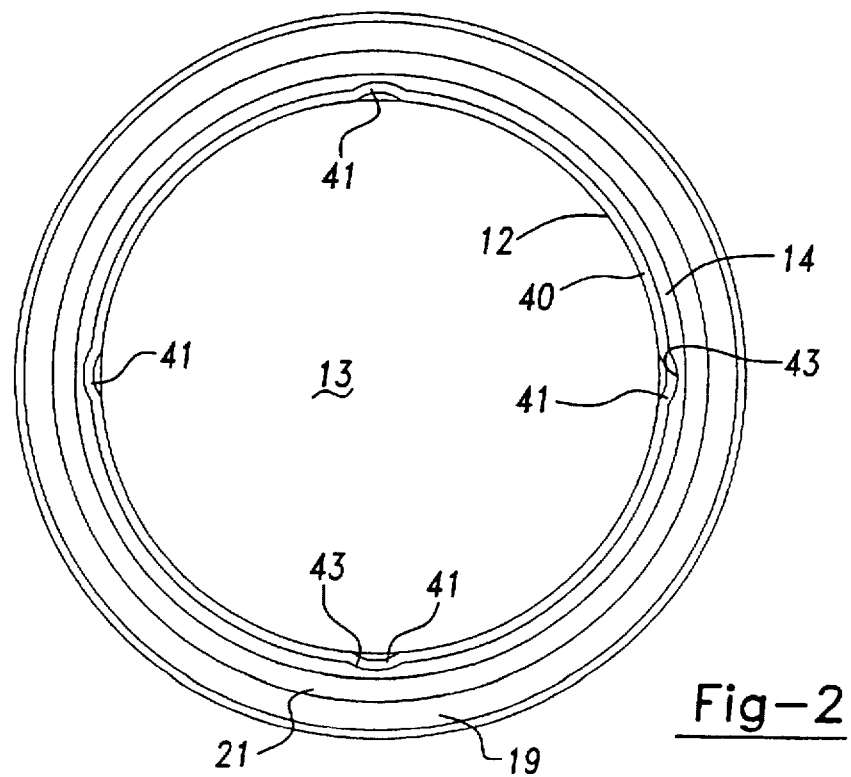
FIG. 2 is a cross-sectional view of the FIG. 1 seal assembly.

An end of inner leg 26 has at least one bent portion 40. As shown in FIG. 2, bent portion 40 is engaged in groove 43 in washer 14. Inner leg 26 thus prevents washer 14 from rotating with ring 18. Preferably, there are a plurality of portions 40 and grooves 43.

Figure 3:
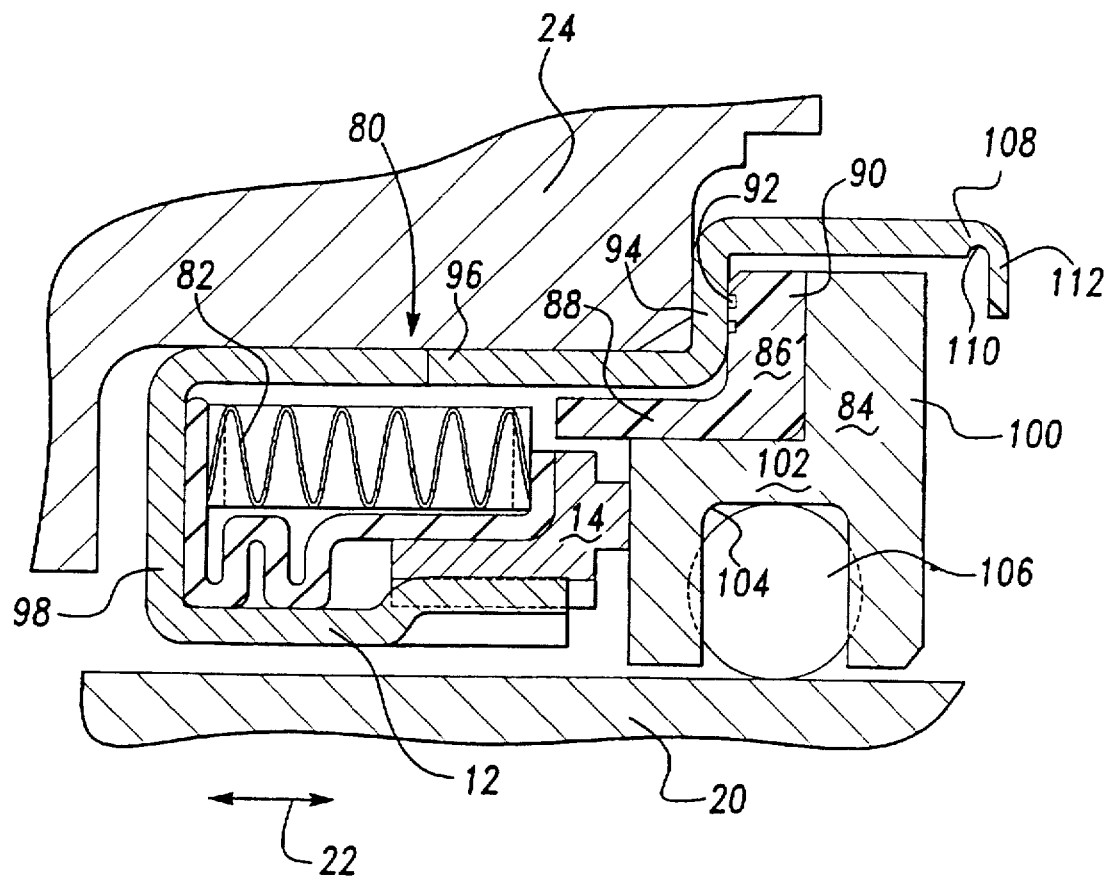
FIG. 3 is a cross-sectional view of a second embodiment of a mechanical face seal assembly according to present invention.

FIG. 3 shows a second embodiment 80 of the present invention. In general, the assembly is similar to the FIG. 1 embodiment. A wave spring 82 biases the washer 14 in this embodiment. A bellows 122 is mounted within retainer 98 for supporting the spring 82 and moving the washer 14 longitudinally along the axis 22. Seal ring 84 includes a ring shaped plastic spacer 86 press fit at an outer periphery of the rotating sealing ring 84. Plastic spacer 86 has a cylindrical portion 88 and a rim 90 that extends radially outward from an end of the cylindrical portion 88. Rim 90 has a set of labyrinth grooves 92. Grooves 92 are adjacent to the portion 94 of the outer leg 96 of retainer 98. Rotating sealing ring 84 has a flange portion 100 extending from a central portion 102 radially outward from the longitudinal axis 22. Further, rotating sealing ring 84 has a guideway 104 within the central portion 102. The plastic spacer 86 extends beyond the central portion 102 of rotating sealing ring 84 such that the tip of spacer portion 88 surrounds the washer 14. An O-ring 106 fits within the guideway 104 of rotating ring 84.

Portion 108 of outer leg 96 has an indentation 110 at the point of deformation to produce face 112 which is deformed radially inward.

The O-ring 106 allows the shaft 20 to pivot within the seal ring 84 and O-ring 106 to allow adjustment. At the same time, the O-ring 106 is tightly received within guideway 104 such that it does ensure the seal ring 84 does rotate with the shaft 20.

In the prior art, it was very difficult to assemble the seal components within the tight space between the housing and the shaft. The present invention simplifies this assembly process, and allows the use of a less complex, less expensive system.

Figure 4:
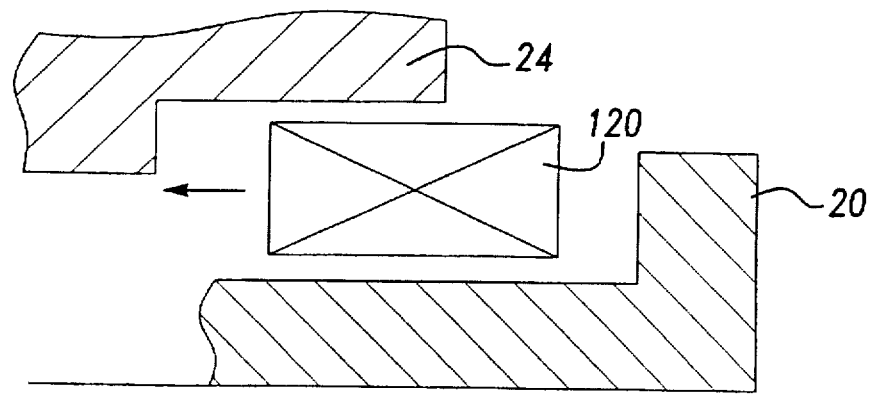
FIG. 4 shows a step in assembly of the inventive seal.

FIG. 4 schematically shows a method of assembling a seal according to the present invention. With both the FIGS. 1 and 3 embodiments, the spring, washer and seal ring and associated parts are all placed within the outer leg of the retainer, with the outer leg of the retainer being in its undeformed position. The outer leg of the retainer is then deformed radially inwardly to provide a unitized seal pack.

As shown in FIG. 4, the unitized seal pack 120 is then placed within the stationary housing 24. The shaft 20 is then forced axially within the seal pack 120.

With the FIG. 1 embodiment, a force to insert the seal pack 120 into the housing may be placed on the face 31. The spring 16 will tend to bias the face 33 against the face 31 until the shaft abuts the shield member 30 and may force it axially inwardly slightly relative to the face 31 as shown in FIG. 1.

In assembling the FIG. 3 embodiment, it is preferable that the force to insert the seal pack 120 into the housing be applied along a radially outer portion of flange portion 100 of seal ring 84. That force is then transmitted through spacer 86 to portion 94 of outer leg 96.

Further in this embodiment, since the seal ring 84 is not fixed to the shaft 20, the O-ring 106 and seal ring 102 may adjust slightly relative to the shaft 20. In addition, in some applications it is possible that the O-ring 106 and seal ring 102 may move axially inwardly along with the shaft such that the plastic spacer portion 90 is brought into contact with the portion 94 of the outer leg 96. Upon continued rotation of the seal ring 84 and spacer 86, the face of the portion 90 abutting portion 94 of the outer leg 96 may wear.

Obviously, many modifications and variations of the present invention are possible in light of the above teachings. It is, therefore, to be understood that within the scope of the appended claims, the invention may be practiced otherwise than as specifically described.

What is claimed is:

1. An assembly comprising:
   a rotating shaft defining a longitudinal axis;
   a stationary housing;
   a cylindrical retainer mounted between said shaft and said housing, and having an inner leg spaced apart from an outer leg to define a recess;
   a sealing ring mounted for rotation with said shaft;
   a washer surrounding said shaft and axially movable within said recess toward said ring;
   a shield attached to said shaft and partially extending into said recess to form a secondary seal, and
   a spring biasing said washer toward said ring.

2. An assembly as set forth in claim 1 including a bellows mounted in said retainer and expanding with movement of said washer longitudinally along said axis toward said seal.

3. An assembly as set forth in claim 1, wherein said shield extends radially outwardly beyond said ring, said outer leg of said retainer extending radially outwardly of, and longitudinally beyond said shield, said outer leg then extending radially inwardly such that a face of said outer leg opposes a face of said shield to form a labyrinth seal.

4. An assembly as set forth in claim 3, wherein said outer leg has a portion initially extending longitudinally from said outer leg, said portion being deformed radially inwardly to be positioned opposite said face of said shield.

5. An assembly comprising:
   a rotating shaft defining a longitudinal axis;
   a stationary housing;
   a cylindrical retainer mounted between said shaft and said housing, and defining a recess;
   a sealing ring mounted for rotation with said shaft;
   a washer surrounding said shaft and axially movable within said recess toward said ring;
   a shield attached to said shaft and partially extending into said recess to form a secondary seal; and
   a spring biasing said washer toward said ring wherein said washer has a rim at an outer periphery and a sealing portion extending from said rim longitudinally toward said ring at a location radially inward of said rim, said spring applying said bias force adjacent said rim.

6. An assembly as set forth in claim 1, wherein said washer includes a longitudinally extending groove and said inner leg of said retainer is partially received in said groove to prevent relative rotation of said retainer and said washer.

7. An assembly comprising:

a rotating shaft defining a longitudinal axis;

a stationary housing;

a cylindrical retainer mounted between said shaft and said housing, and defining a recess;

a sealing ring mounted for rotation with said shaft wherein said ring surrounds said shaft, an O-ring being received at a radially inner portion of said ring and allowing tilting movement of said shaft within said ring;

a washer surrounding said shaft and axially movable within said recess toward said ring; and a spring biasing said washer toward said ring.

8. An assembly comprising:

a rotating shaft defining a longitudinal axis;

a stationary housing;

a cylindrical retainer mounted between said shaft and said housing, and defining a recess;

a sealing ring mounted for rotation with said shaft wherein said ring carries a plastic spacer, a face of said spacer facing a face of said retainer;

a washer surrounding said shaft and axially movable within aid recess toward said ring; and a spring biasing said washer toward said ring.

9. An assembly as recited in claim 8, wherein said spacer includes grooves to provide a labyrinth seal between said spacer and said housing.

10. A mechanical face seat assembly comprising:

a retainer to be mounted to a stationary housing and for surrounding a rotating shaft, said retainer having a base connecting radially inner and outer legs, said inner leg being generally cylindrical and defining an axis;

a washer mounted between said inner and outer legs, said washer being axially movable along said axis and relative to said inner and outer legs;

a sealing ring to be mounted for rotation with a shaft, said sealing ring being positioned to face said washer;

a spring disposed within said retainer for axially biasing said washer toward said ring;

a shield attached to the shaft and extending radially outwardly from the shaft; and said outer leg of said retainer having a portion extending axially beyond said shield and over said sealing ring, an axially outermost portion of said outer leg being adapted to be deformed radially inwardly to face said shield after said washer and ring are positioned within said retainer.

11. An assembly as set forth in claim 10 including a bellows mounted in said retainer and expanding with movement of said washer longitudinally along said axis toward said seal.

12. An assembly as set forth in claim 10, wherein said shield has a recess and said ring is secured within said recess, said shield being adapted to be fixed to an outer periphery of the shaft to secure said ring on the shaft.

13. An assembly as set forth in claim 10, wherein said washer has a rim at an outer periphery and a sealing portion extending from said rim axially toward said ring at a location radially inward of said rim said spring applying its bias force adjacent said rim.

14. An assembly as set forth in claim 10, wherein said washer includes a longitudinally extending groove and said inner leg of said retainer is partially received in said groove to prevent relative rotation of said retainer and said washer.

15. An assembly as set forth in claim 10, wherein an O-ring is placed in a groove at an inner periphery of said ring.

16. An assembly as set forth in claim 10, wherein a plastic spacer is attached to said ring and has a face facing a component that will be stationary in use.

17. An assembly as set forth in claim 16, wherein said component is a portion of said retainer.

18. An assembly as set forth in claim 17, wherein said spacer face has grooves to provide a labyrinth seal between said spacer and said ring.

19. A method of assembling a mechanical seal comprising the steps of:

providing a rotating shaft defining a longitudinal axis and a stationary housing;

providing a shield supported on the shaft and extending radially outwardly from the shaft;

providing a cylindrical retainer having inner and outer legs extending longitudinally, the inner leg spaced radially inward from the outer leg, the outer leg having a cylindrical portion extending axially beyond the shield;

mounting a washer to be axially movable within the retainer;

mounting a spring in the retainer for biasing the washer;

mounting a sealing ring adjacent to said shield;

deforming a cylindrical portion of the outer leg radially inwardly such that a face of the outer leg secures the washer, spring and ring within the retainer to form a unitized seal; and mounting the unitized seal between the housing and the shaft.

20. A method as set forth in claim 19, wherein said ring is mounted to rotate with said shaft.

* * * * *